(12) United States Patent
Savolainen et al.

(10) Patent No.: US 11,070,546 B2
(45) Date of Patent: Jul. 20, 2021

(54) TWO-USER AUTHENTICATION

(71) Applicant: Nokia Technologies Oy, Espoo (FI)

(72) Inventors: Teemu Ilmari Savolainen, Nokia (FI); Jyri Hämäläinen, Helsinki (FI); Markus Isomäki, Espoo (FI); István Beszteri, Espoo (FI)

(73) Assignee: Nokia Technologies Oy, Espoo (FI)

( * ) Notice: Subject to any disclaimer, the term of this patent is extended or adjusted under 35 U.S.C. 154(b) by 189 days.

(21) Appl. No.: 15/742,627

(22) PCT Filed: Jul. 9, 2015

(86) PCT No.: PCT/FI2015/050497
§ 371 (c)(1),
(2) Date: Jan. 8, 2018

(87) PCT Pub. No.: WO2017/005962
PCT Pub. Date: Jan. 12, 2017

(65) Prior Publication Data
US 2018/0198782 A1    Jul. 12, 2018

(51) Int. Cl.
*H04L 9/00* (2006.01)
*H04L 29/06* (2006.01)
(Continued)

(52) U.S. Cl.
CPC .......... *H04L 63/0853* (2013.01); *G06F 21/40* (2013.01); *H04L 9/3213* (2013.01);
(Continued)

(58) Field of Classification Search
CPC . H04L 63/0853; H04L 9/3213; H04L 9/3234; H04L 29/06; H04L 63/102;
(Continued)

(56) References Cited

U.S. PATENT DOCUMENTS

| 8,769,289 B1 | 7/2014 | Kronrod |
| 9,032,498 B1 * | 5/2015 | Ben Ayed ......... H04W 12/0608 726/9 |

(Continued)

FOREIGN PATENT DOCUMENTS

| CN | 101296226 A | 10/2008 |
| CN | 102801722 A | 11/2012 |

(Continued)

OTHER PUBLICATIONS

International Search Report and Written Opinion received for corresponding Patent Cooperation Treaty Application No. PCT/FI2015/050497, dated Nov. 17, 2015, 15 pages.

(Continued)

*Primary Examiner* — Josnel Jeudy
(74) *Attorney, Agent, or Firm* — Laine IP Oy

(57) ABSTRACT

According to an example aspect of the present invention, there is provided an apparatus comprising at least one processing core, at least one memory including computer program code, the at least one memory and the computer program code being configured to, with the at least one processing core, cause the apparatus at least to receive from a first device a digital key, receive from a second device an encrypted data item, decrypt the encrypted data item using the digital key to obtain a decrypted data item, and verify the decrypted data item matches a reference data item, and responsive to the decrypted data item matching the reference data item, grant access to at least one of the first device and the second device.

20 Claims, 6 Drawing Sheets

(51) Int. Cl.
*H04L 9/32* (2006.01)
*G06F 21/40* (2013.01)

(52) U.S. Cl.
CPC ............ H04L 9/3234 (2013.01); H04L 29/06 (2013.01); H04L 63/102 (2013.01); H04L 63/123 (2013.01); *H04L 63/0435* (2013.01); *H04L 63/0442* (2013.01); *H04L 2463/082* (2013.01)

(58) Field of Classification Search
CPC ............... H04L 63/123; H04L 63/0435; H04L 63/0442; H04L 2463/082; G06F 21/40
USPC .......................................................... 713/168
See application file for complete search history.

(56) References Cited

U.S. PATENT DOCUMENTS

| | | | |
|---|---|---|---|
| 9,189,627 B1* | 11/2015 | Islam | G06F 21/562 |
| 9,942,211 B1* | 4/2018 | Campagna | H04L 63/06 |
| 2005/0078825 A1* | 4/2005 | Ohmori | H04N 21/63345 |
| | | | 380/255 |
| 2009/0097661 A1* | 4/2009 | Orsini | G06F 21/45 |
| | | | 380/279 |
| 2010/0223468 A1* | 9/2010 | Sun | H04L 63/062 |
| | | | 713/168 |
| 2011/0099591 A1* | 4/2011 | Long | H04N 21/443 |
| | | | 725/81 |
| 2012/0011360 A1 | 1/2012 | Engels et al. | |
| 2013/0247163 A1 | 9/2013 | Ganem | |
| 2013/0291056 A1 | 10/2013 | Gaudet et al. | |
| 2014/0298434 A1 | 10/2014 | Prchal | |
| 2014/0333413 A1 | 11/2014 | Kursun | |
| 2015/0082020 A1 | 3/2015 | Thompson | |
| 2015/0113621 A1 | 4/2015 | Glickfield et al. | |
| 2015/0140964 A1 | 5/2015 | Horton | |
| 2015/0215116 A1* | 7/2015 | Gong | H04L 9/12 |
| | | | 380/256 |
| 2015/0229621 A1* | 8/2015 | Kariman | H04L 63/0478 |
| | | | 713/168 |
| 2015/0332573 A1* | 11/2015 | Selmanovic | H04W 4/02 |
| | | | 455/457 |
| 2017/0048058 A1* | 2/2017 | Ren | H04L 9/30 |
| 2017/0055152 A1* | 2/2017 | Zhang | H04L 63/0428 |
| 2019/0207758 A1* | 7/2019 | Cambou | H04L 9/0866 |

FOREIGN PATENT DOCUMENTS

| | | |
|---|---|---|
| CN | 104025499 A | 9/2014 |
| WO | 2007126375 | 11/2007 |
| WO | 2009145733 | 12/2009 |
| WO | 2012/122175 A1 | 9/2012 |
| WO | 2014/016619 A1 | 1/2014 |
| WO | 2015/071707 A1 | 5/2015 |

OTHER PUBLICATIONS

Hu, Vicent C. et al. "Assessment of Access Control Systems", NIST INteragency Report 7316, Sep. 2006. Retrieved from Internet: <http://csrs.nist.gov/publication/nistir/7316/NISTIR-7316.pdf>.
"Multiparty Authentication and Cryptosystems in the IoT—Part 2", Mcafee, Retrieved on Mar. 20, 2019, Webpage available at : https://blogs.mcafee.com/business/multiparty-authentication-cryptosystems-iot-part-2.
"NEC, CA Technologies Team Up for Cloud Authentication", Networksasia, Retrieved on Mar. 20, 2019, Webpage available at : http://www.networksasia.net/article/nec-ca-technologies-team-cloud-authentication-1329257552.
"NEC Bolsters Cloud Service Protection with CA Technologies", Hardwarezone, Retrieved on Mar. 20, 2019, Webpage available at : https://www.hardwarezone.com.my/tech-news-nec-bolsters-cloud-service-protection-ca-technologies.
"Two-Man Rule", Wikipedia, Retrieved on Mar. 20, 2019, Webpage available at : https://en.wikipedia.org/wiki/Two-man_rule.
Extended European Search Report received for corresponding European Patent Application No. 15897615.9, dated Feb. 27, 2019, 6 pages.

* cited by examiner

TWO-USER AUTHENTICATION

RELATED APPLICATION

This application was originally filed as PCT Application No. PCT/FI2015/050497 filed Jul. 9, 2015.

FIELD

The present invention relates to authentication procedures between communicating devices.

BACKGROUND

Authentication involves providing assurances of identity or authorization to a party, in order to access resources controlled by that party. For example, in order to access an internet banking system, a user must authenticate himself, to prove his identity and that he is the client. Requiring authentication prior to substantial access thus prevents unauthorized parties from accessing the client's savings.

Authentication may also be employed in granting a device access to services provided by another device. For example, a cellular telephone may be required to authenticate itself to a cellular network, before the cellular telephone is allowed to place or receive telephone calls over the network. Such authentication may be based, at least in part, on a secret stored on the cellular telephone, for example in a subscriber identity module, SIM.

Authentication of a cellular telephone to a network may take place between the SIM and an authentication server disposed in the network. Messages may be relayed to the authentication server via a base station and at least one core network node, for example.

When authentication is based on a single element, such as a password, the authentication method may become compromised when the single element is stolen. To overcome such single-factor vulnerability, multi-factor authentication may be employed. An example of multi-factor authentication is two-factor authentication, where two elements are used in authentication. Authentication is successful only if both elements are correctly present in two-factor authentication. More generally, in multi-factor authentication, authentication is successful only if each of the required multiple elements are correctly present in the multi-factor authentication.

An example of two-factor authentication is a chip and pin authentication used in credit card cash withdrawal. Access to the credit account associated with the credit card is only granted if the user can produce both the card, which comprises a chip, and the pin code associated with the card. The card without the pin code, or the pin code without the card, is not sufficient to access the credit account.

Another example of two-factor authentication is a two-man rule, where one person controls a first authentication element and a second person controls a second authentication element. For example, in some banks a combination that unlocks a safe can be split into two sub-codes, which together form the unlocking combination. The sub-codes can be assigned to different persons to ensure that no single person acting alone can access the contents of the safe.

SUMMARY OF THE INVENTION

The invention is defined by the features of the independent claims. Some specific embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to receive from a first device a digital key, receive from a second device an encrypted data item, decrypt the encrypted data item using the digital key to obtain a decrypted data item, and verify the decrypted data item matches a reference data item, and responsive to the decrypted data item matching the reference data item, grant access to at least one of the first device and the second device.

Various embodiments of the first aspect may comprise at least one feature from the following bulleted list:
- the at least one memory and the computer program code are configured to, with the at least one processing core, cause the apparatus to decrypt the encrypted data item using, at least in part, an exclusive-or, XOR, operation with the digital key and the encrypted data item
- the at least one memory and the computer program code are configured to, with the at least one processing core, cause the apparatus to decrypt the encrypted data item using, at least in part, a symmetric decryption algorithm
- the at least one memory and the computer program code are configured to, with the at least one processing core, cause the apparatus to decrypt the encrypted data item using, at least in part, a public key decryption algorithm
- the at least one memory and the computer program code are configured to, with the at least one processing core, cause the apparatus to grant access to the first device
- the at least one memory and the computer program code are configured to, with the at least one processing core, cause the apparatus to grant at least one of the first device and the second device access to a service provided by or controlled by the apparatus
- the service comprises at least one of the following: a media playback service, a data storage service and a physical access control service
- the at least one memory and the computer program code are configured to, with the at least one processing core, cause the apparatus to decrypt, using an encryption key stored in the apparatus, the decrypted data item prior to the verifying.

According to a second aspect of the present invention, there is provided an apparatus comprising at least one processing core, at least one memory including computer program code, the at least one memory and the computer program code being configured to, with the at least one processing core, cause the apparatus at least to encrypt a reference data item with a digital key generated by the apparatus to obtain an encrypted data item, provide the digital key to a first device, and provide the encrypted data item to a second device.

Various embodiments of the second aspect may comprise at least one feature from the following bulleted list:
- the at least one memory and the computer program code are configured to, with the at least one processing core, cause the apparatus to verify whether the first device is authorized to access a service providing apparatus, and to provide the digital key to the first device only responsive to the first device being verified as authorized to access the service providing apparatus
- the at least one memory and the computer program code are configured to, with the at least one processing core, cause the apparatus to verify whether the apparatus has received requests from devices that can satisfy a two-man rule of a further apparatus the at least one memory and the computer program code are configured to, with the at least one processing core, cause the apparatus to verify whether the first device is authorized to access a service providing apparatus by checking whether an identity of the first device is comprised in a list of identities of devices that are authorized to access the service providing apparatus the at least one memory and the computer program code are configured to, with the at least one processing core, cause the apparatus to encrypt the reference data item using, at least in part, an exclusive-or, XOR, operation with the digital key and the reference data item the at least one memory and the computer program code are configured to, with the at least one processing core, cause the apparatus to encrypt the reference data item using, at least in part, a symmetric encryption algorithm the at least one memory and the computer program code are configured to, with the at least one processing core, cause the apparatus to encrypt the reference data item using, at least in part, a public key encryption algorithm.

According to a third aspect of the present invention, there is provided a method comprising receiving, in an apparatus, from a first device, a digital key, receiving, from a second device, an encrypted data item, decrypting the encrypted data item using the digital key to obtain a decrypted data item, and verifying the decrypted data item matches a reference data item, and responsive to the decrypted data item matching the reference data item, granting access to at least one of the first device and the second device.

Various embodiments of the third aspect may comprise at least one feature corresponding to a feature from the preceding bulleted list laid out in connection with the first aspect.

According to a fourth aspect of the present invention, there is provided a method comprising encrypting a reference data item with a digital key generated by an apparatus, to obtain an encrypted data item, providing the digital key to a first device, and providing the encrypted data item to a second device.

Various embodiments of the fourth aspect may comprise at least one feature corresponding to a feature from the preceding bulleted list laid out in connection with the second aspect.

According to a fifth aspect of the present invention, there is provided an apparatus comprising means for receiving, in an apparatus, from a first device, a digital key, means for receiving, from a second device, an encrypted data item, means for decrypting the encrypted data item using the digital key to obtain a decrypted data item, and means for verifying the decrypted data item matches a reference data item, and responsive to the decrypted data item matching the reference data item, for granting access to at least one of the first device and the second device.

According to a sixth aspect of the present invention, there is provided an apparatus comprising means for encrypting a reference data item with a digital key generated by an apparatus, to obtain an encrypted data item, means for providing the digital key to a first device, and means for providing the encrypted data item to a second device.

According to a seventh aspect of the present invention, there is provided a non-transitory computer readable medium having stored thereon a set of computer readable instructions that, when executed by at least one processor, cause an apparatus to at least receive, in an apparatus, from a first device, a digital key, receive, from a second device, an encrypted data item, decrypt the encrypted data item using the digital key to obtain a decrypted data item, and verify the decrypted data item matches a reference data item, and responsive to the decrypted data item matching the reference data item, grant access to at least one of the first device and the second device.

According to an eighth aspect of the present invention, there is provided a non-transitory computer readable medium having stored thereon a set of computer readable instructions that, when executed by at least one processor, cause an apparatus to at least encrypt a reference data item with a digital key generated by an apparatus, to obtain an encrypted data item, provide the digital key to a first device, and provide the encrypted data item to a second device.

According to a ninth aspect of the present invention, there is provided a computer program configured to cause a method in accordance with at least one of the third and fourth aspects to be performed.

EMBODIMENTS

An apparatus such as, for example, an Internet of Things, IoT, apparatus may require two-person authentication before granting access to a device. In detail, a first user may be given access only when a second user is also present. A server device may provide as authentication elements an encrypted data item and the corresponding encryption key to the first user and the second user, respectively, such that each of the two users can then provide his authentication element to the apparatus, and the apparatus is thereby enabled to verify the key can decrypt the encrypted data item. Thus the apparatus may determine that the first user and the second user are both present.

Figure 1:
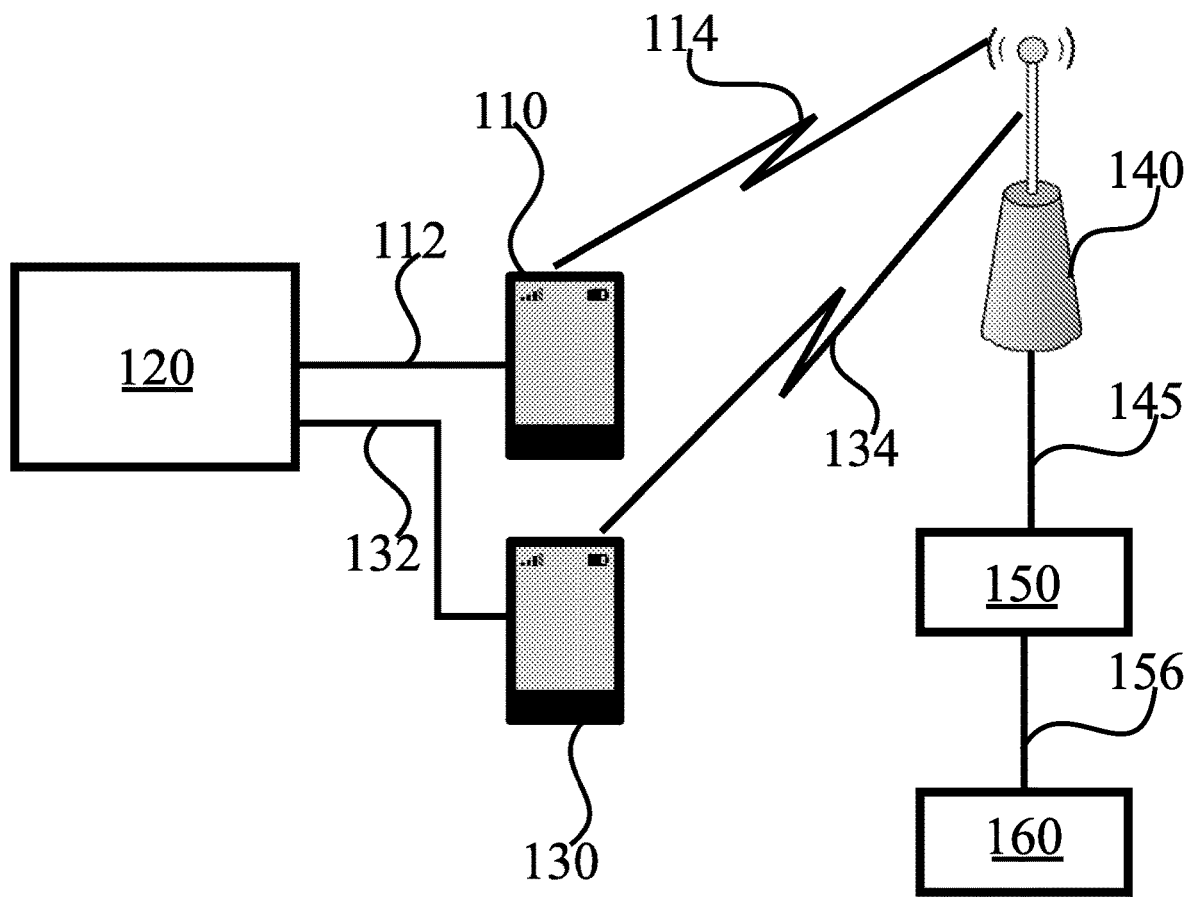
FIG. 1 illustrates an example system in accordance with at least some embodiments of the present invention.

FIG. 1 illustrates an example system in accordance with at least some embodiments of the present invention. The system comprises device 110, which may comprise, for example, a tablet computer, smartphone, phablet, laptop computer, desktop computer or indeed another type of suitable device. Device 110 may run a version of Windows phone, Android or Linux operating system, for example.

Apparatus 120 may comprise, for example, a digital television, a data storage service, a home automation controller, an industrial saw, a medical device that emits ionizing radiation or another kind of suitable device. Apparatus 120 may comprise an Internet of Things, IoT, device which can receive communications, for example based on an internet protocol version 6, IPv6, or version 4, IPv4, addressing scheme. Apparatus 120 may in general comprise an apparatus that device 110 may wish to use or access in some way. Apparatus 120 may be access restricted in the sense that not all devices will be granted access thereto. Apparatus 120 may be configured to enforce a two-man authentication rule.

Device 110 has a connection 112 with apparatus 120. Connection 112 may comprise a wireless connection, such as for example a short-range wireless connection, such as a Bluetooth, Bluetooth LE, IEEE802.11 or Wibree connection, for example. Such connections may use IP, IPv6, CoAP, HTTP, MQTT or Bluetooth Generic Attribute Profile, GATT, protocols, for example. Connection 112 may comprise an optical connection, and/or a wire-line connection. A connection that is both optical and wire-line may comprise a fibre optic connection, for example.

Apparatus 120 may require device 110 to perform an authentication process with apparatus 120 prior to allowing device 110 to access data or services of apparatus 120. For example, apparatus 120 may require two-person authentication. In various embodiments, two-person authentication may be required when apparatus 120 controls access to cash, valuable items, secret documents, narcotic medicaments or weapons, for example. A further example is an industrial process control room service, wherein it may be a requirement that at least two persons are always present in a control room, so that in case of a medical emergency concerning one person, there will remain at least one further person present who can control the industrial process. A yet further example is a file server system, wherein access to files stored in the file server system may be granted by apparatus 120. In some embodiments, apparatus 120 controls a media playback service, which children can only access when accompanied by an adult.

While device 110 may correspond to a first user who seeks access to apparatus 120, device 130 may correspond to a second user whose presence is needed as a prerequisite for access to be granted to device 110. More simply, devices 110 and 130 may correspond to individual users, and presence of at least two such users may be needed as a prerequisite for access to apparatus 120 to be granted. Device 130 may comprise, like device 110, a tablet computer, smartphone, smart watch, phablet, laptop computer, desktop computer or another type of suitable device. Device 130 need not be of a same type as device 110. To prove to apparatus 120 that both device 110 and device 130 are near apparatus 120, device 110 may provide a first authentication element to apparatus 120 over connection 112, and device 130 may provide a second authentication element to apparatus 120 over connection 132, which may comprise a short-range wired or at least in part wireless connection, much like connection 112, for example.

Device 110 may request for the first authentication element from server 160. Device 110 may use a wireless link 114 with an access point 140 to communicate with the server. Messages exchanged between device 110 and server 160 may further traverse, along the way, a network node 150, which may comprise a gateway, for example. Connection 156 between network node 150 and server 160 may traverse at least one network. Connection 145 between access point 140 and network node 150 may comprise a wire-line connection, for example. In some embodiments, network node 150 is absent. Access point 140 may comprise a cellular or non-cellular access point, for example. A cellular access point may be referred to terminologically as a base station. Cellular technologies include, for example, wideband code division multiple access, WCDMA, and long term evolution, LTE. Non-cellular technologies include, for example, wireless local area network, WLAN, and worldwide interoperability for microwave access, WiMAX.

Device 130 may request for the second authentication element from server 160. For example, device 130 may communicate with server 160 via wireless link 134, access point 140 and, optionally, network node 150. While links 114 and 134 are disclosed herein as wireless in connection with the FIG. 1 embodiments, in other embodiments these links may be wire-line, at least in part. In various embodiments, device 130 may use a different route to communicate with server 160 than device 110 does. For example, device 110 may access server 160 via a WLAN access and device 130 may access server 160 via a WLAN or cellular access, for example. A user of device 130 may trigger or approve the participation of device 130 in the two-man authentication procedure.

Server 160 may be comprised in or as a cloud service platform. Therefore, additionally or alternatively to server 160 comprising a physical standalone server, in various embodiments server 160 may be a virtual server running in a cloud service platform, the platform being not necessarily dedicated to the server 160.

Server 160 may store a reference data item in a memory that is comprised in server 160, or is otherwise accessible to server 160. The reference data item may also be available to apparatus 120. For example, the reference data item may be pre-configured in server 160 and apparatus 120, or server 160 and apparatus 120 may have established it using a cryptographic process between themselves. The reference data item may comprise a password, passphrase or a randomly generated binary string or file, for example. Additionally or alternatively, server 160 and apparatus 120 may share cryptographic keying material, such as, for example, pre-shared keys. Server 160 may verify that device 110, or a user of device 110, is authorized to access apparatus 120. Such verification may comprise checking that in addition to device 110 requesting the first authentication element, device 130 has requested the second authentication element, for example such that at most a predefined time period separates these requests from each other. In general, server 160 may generate the authentication elements at least in part in response to a determination that it has received requests from devices that can, acting together, satisfy a two-man rule of apparatus 120.

Server 160 may derive the first and second authentication elements by encrypting the reference data item with a key that server 160 may obtain, for example by generating it using a random or pseudo-random process. The key may be comprised in or as the first authentication element and the encrypted reference data item may be comprised in or as the second authentication element. The key may comprise a digital key. The reference data item and the encrypted data item may comprise digital data items.

Server 160 may be configured to provide the first and second authentication elements to device 110 and device 130, respectively, over secured connections. Device 110 and/or device 130 may not know whether they have received the reference data item or the key. The reference data item and the key may be of the same length. The connections may be secured using a secured communication protocol, such as, for example, https or ssh. The secured connections may be secured using keying material present in a subscriber identity module, SIM, or similar unit in device 110 and device 130, respectively, for example. Server 160 may authenticate device 110 and device 130 before providing the authentication elements. In case authentication fails for at least one of device 110 and device 130, server 160 may refuse to provide the authentication elements. To protect against device 110 and 130 acting together to discover the reference data item, the reference data item may be first encrypted by server 160, using a key that apparatus 120 also has, before encrypting the reference data item for delivery in or as the second authentication element. Prior to the first encrypting, a dynamic part of the reference data item may be modified in server 160, for example by including a timestamp or counter value, to prevent replay-type attacks.

Once device 110 has the first authentication element, it can provide it to apparatus 120, via connection 112. This providing may be comprised, for example, in a Bluetooth low-energy, BT LE, generic attribute profile, GATT, characteristics write operation between device 110 and apparatus 120. Alternatively, for example, constrained application protocol, CoAP, may be employed. Device 110 may be an endpoint in the communication wherein the first authentication element is provided from device 110 to apparatus 120.

Once device 130 has the second authentication element, it can provide it to apparatus 120, via connection 132. This providing may be comprised, for example, in a Bluetooth low-energy, BT LE, generic attribute profile, GATT, characteristics write operation between device 130 and apparatus 120. Other protocols may alternatively, or additionally, be used. Device 130 may be an endpoint in the communication wherein the first authentication element is provided from device 130 to apparatus 120.

Once apparatus 120 has the first authentication element and the second authentication element, it can verify the authentication elements by using one to decrypt the other, for example. For example, apparatus 120 may provide, for example internally in apparatus 120, at least part of the first authentication element and at least part of the second authentication element to a decrypting algorithm, to obtain a decrypted data item. The decrypting algorithm may comprise an exclusive-or, XOR, procedure or a symmetric algorithm, or, for example, a public-key algorithm. Examples of symmetric algorithms include advanced encryption standard, AES, and triple-data encryption standard, 3DES. The decryption algorithm employed by apparatus 120 may correspond to the encryption algorithm used in server 160. Apparatus 120 may compare the decrypted data item to a copy of the reference data item it has, and responsive to the decrypted data item matching the reference data item, apparatus 120 may provide access to device 110. The decrypted data item matches the reference data item if they have the same content. In case server 160 encrypted the reference data item two times, the first encryption may need to also be decrypted before matching with the reference data item stored in apparatus 120.

While described herein primarily as a process wherein the device seeking access provides the key as its authentication element, in other embodiments the device seeking access may provide the encrypted data item as its authentication element, without departing from the scope of the invention. Further, in some embodiments both devices providing authentication elements are given access to apparatus 120.

Figure 2:
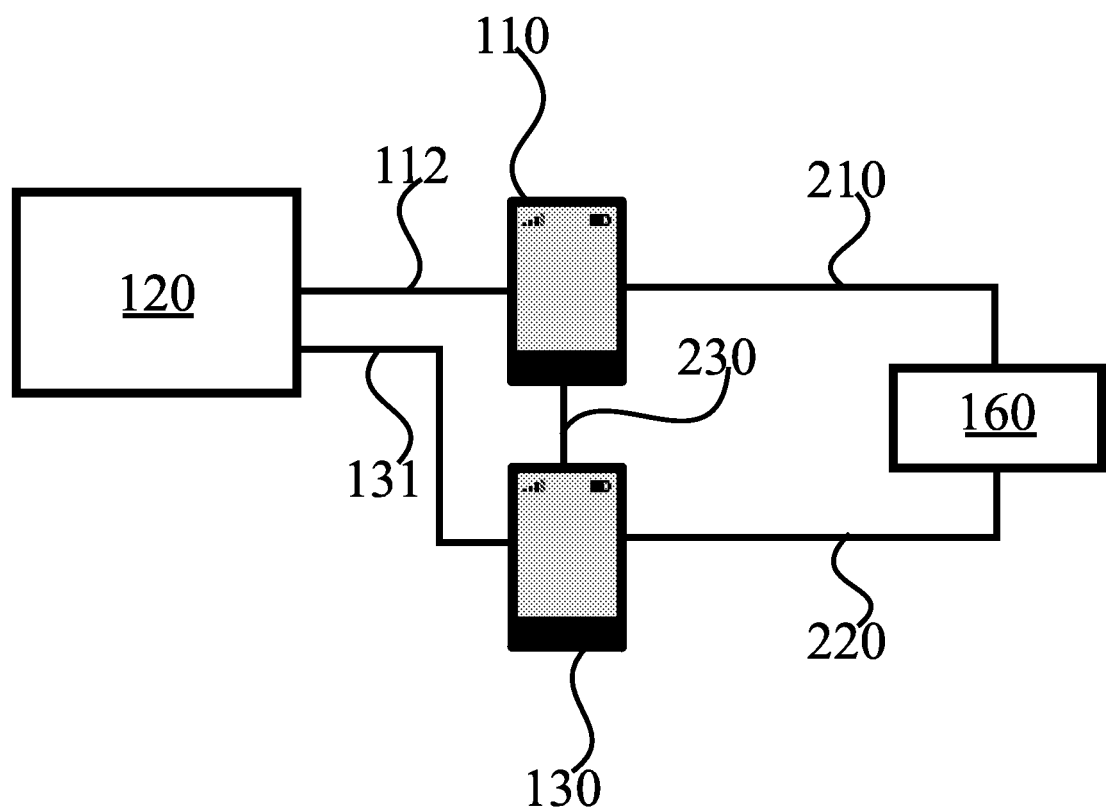
FIG. 2 illustrates an example system in accordance with at least some embodiments of the present invention.

FIG. 2 illustrates an example system in accordance with at least some embodiments of the present invention. Like numbering denotes like structure as in FIG. 1. In the system of FIG. 2, device 110 has a wire-line interface 210 with server 160, and device 130 likewise has a wire-line interface 220 with server 160. The wire-line interfaces 210 and 220 may comprise a near field communication, NFC, tag reader coupled by a wire-line interface to server 160, for example. Device 110 and device 130 may use the same NFC tag reader. The wire-line interfaces 210 and 220 enable devices 110 and 130, respectively, to communicate more directly with server 160 than the system of FIG. 1.

The system of FIG. 2 further comprises an optional inter-device interface 230. Inter-device interface 230 may comprise, for example, a short-range wireless interface. Where device 110 is the device that seeks access to apparatus 120, it may trigger, via inter-device interface 230, device 130 to participate in the two-person authentication procedure described herein, in particular, to request the second authentication element from server 160, and to provide it to apparatus 120 over connection 131. An inter-device interface may also be present in a system such as that illustrated in FIG. 1. Alternatively to a distinct inter-device interface, where device 110 and device 130 have wireless cellular connectivity, device 110 may prompt device 130 to participate in the authentication procedure by addressing a message to device 130 over the cellular communication system. In case device 130 determines it is in the vicinity of apparatus 120 and that device 110 also is, device 130 may then perform its part in the authentication procedure.

Figure 3:
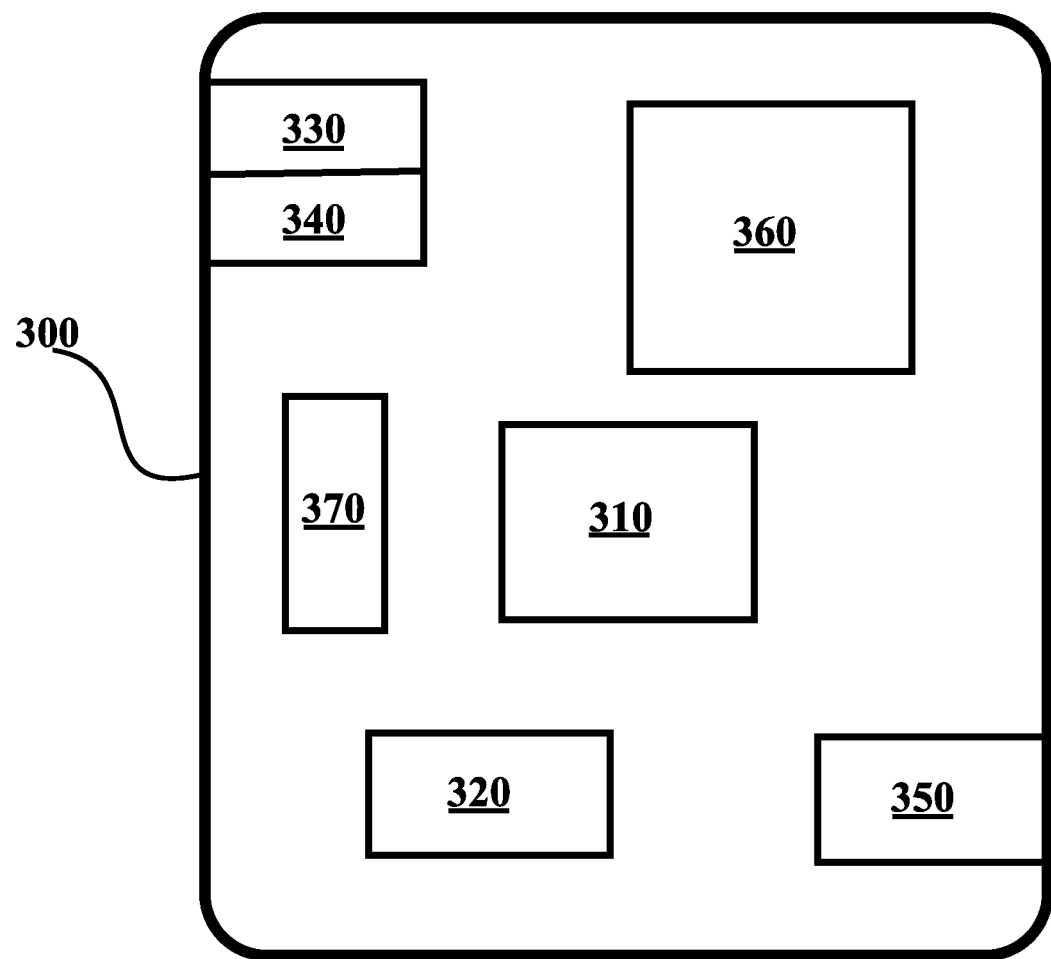
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as device 110 or device 130 of FIG. 1 or FIG. 2, or, in applicable aspects, apparatus 120 or server 160. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to seek access to a further apparatus to control this further apparatus.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370. Where device 300 corresponds to apparatus 120, apparatus 120 being an industrial apparatus, device 300 may comprise actuators and/or sensors needed to perform the industrial task the apparatus is designed to perform.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
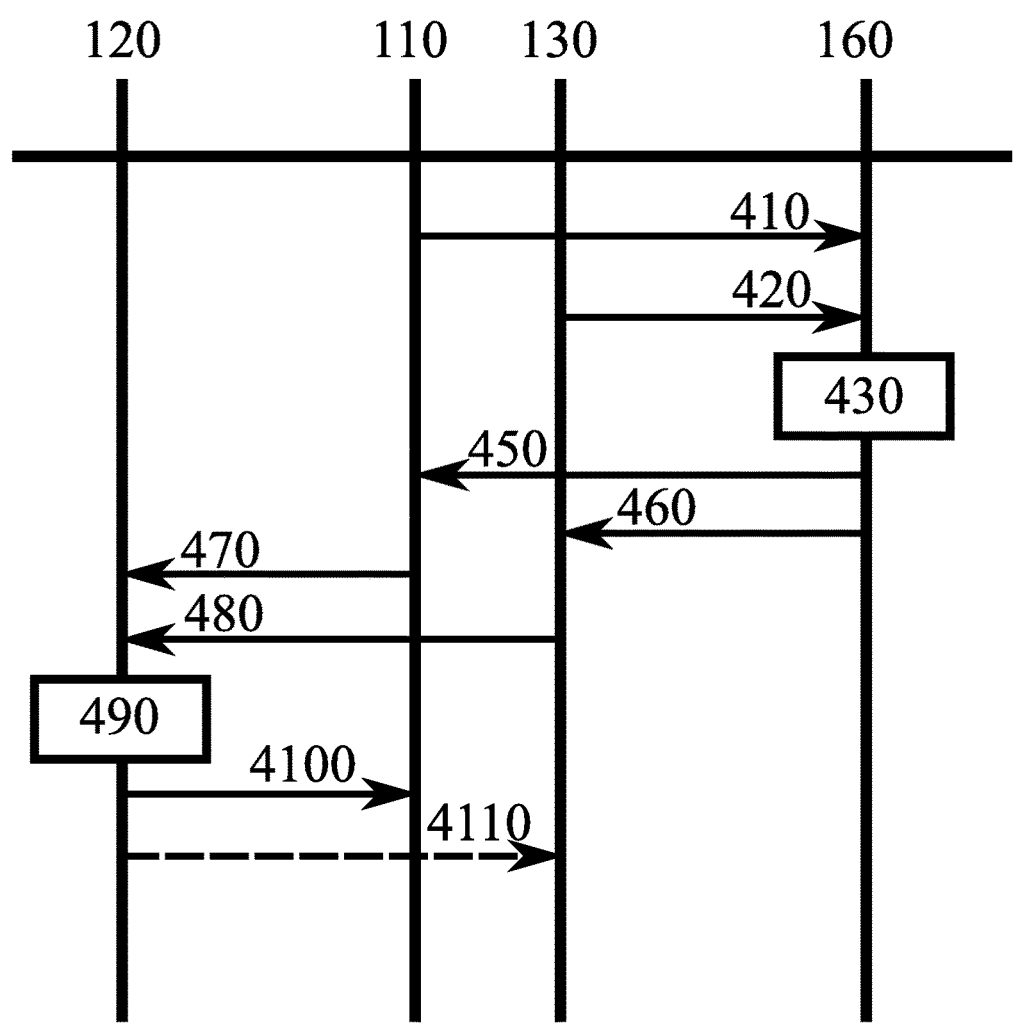
FIG. 4 illustrates signalling in accordance with at least some embodiments of the present invention.

FIG. 4 illustrates signalling in accordance with at least some embodiments of the present invention. On the vertical axes are disposed, in terms of FIG. 1, from left to right, apparatus 120, device 110, device 130, and, finally, server 160. Time advances from the top toward the bottom.

In phase 410, device 110 requests server 160 to provide the first authentication element to device 110. In phase 420, device 130 requests server 160 to provide the second authentication element to device 130. The requests of phases 410 and 420 may be authenticated and/or encrypted, as described above. In phase 430, server 160 generates the authentication elements. In detail, server 160 may encrypt the reference data item with a key server 160 has generated. In phases 450 and 460, server 160 provides the first authentication element and the second authentication element to device 110 and device 130, respectively. Server 160 may generate the authentication elements at least in part as a response to a determination that both device 110 and device 130 have requested their respective authentication elements. In general, server 160 may generate the authentication elements at least in part in response to a determination that it has received requests from devices that can satisfy a two-man rule of apparatus 120. As described above, in some embodiments server 160 encrypts the reference data item two times, first with a key that server 160 and apparatus 120 have, and a second time with the key that corresponds to one of the two authentication elements.

Device 110 may provide its authentication element to apparatus 120 in phase 470. Device 120 may provide its authentication element to apparatus 120 in phase 480. Phases 470 and 480 need not occur in the order illustrated in FIG. 4.

Once apparatus 120 has both authentication elements, received from the two devices, it may verify the authentication elements are genuine. For example, apparatus 120 may use the first authentication element, or part thereof, to decrypt the second authentication element, or part thereof. In case a result of this decrypting operation matches the copy of the reference data item apparatus 120 has, the authentication elements may be considered to be successfully verified, and access to apparatus 120 or services thereof may be granted to device 110, for example. In case server 160 encrypted the reference data item two times, the first encryption may need to also be decrypted before matching with the reference data item stored in apparatus 120. Other ways to overcome a potential attack based on collaborating devices 110 and 130 include transmitting a hash calculated over secrets not shared with device 110 or device 130, and the data passed through device 110 and/or device 130. This would enable apparatus 120 to verify the hash has been calculated by server 160 and not by devices 110 and 130 acting maliciously. Examples of hash algorithms include MD5, SHA1 and SHA256.

Device 110 may be informed of the granting of the access, in a message of phase 4100. In optional phase 4110, device 130 is informed that the authentication it participated in was successful. In case the authentication elements were incorrect, phases 4100 and, optionally, 4110, may provide an error indication.

Figure 5:
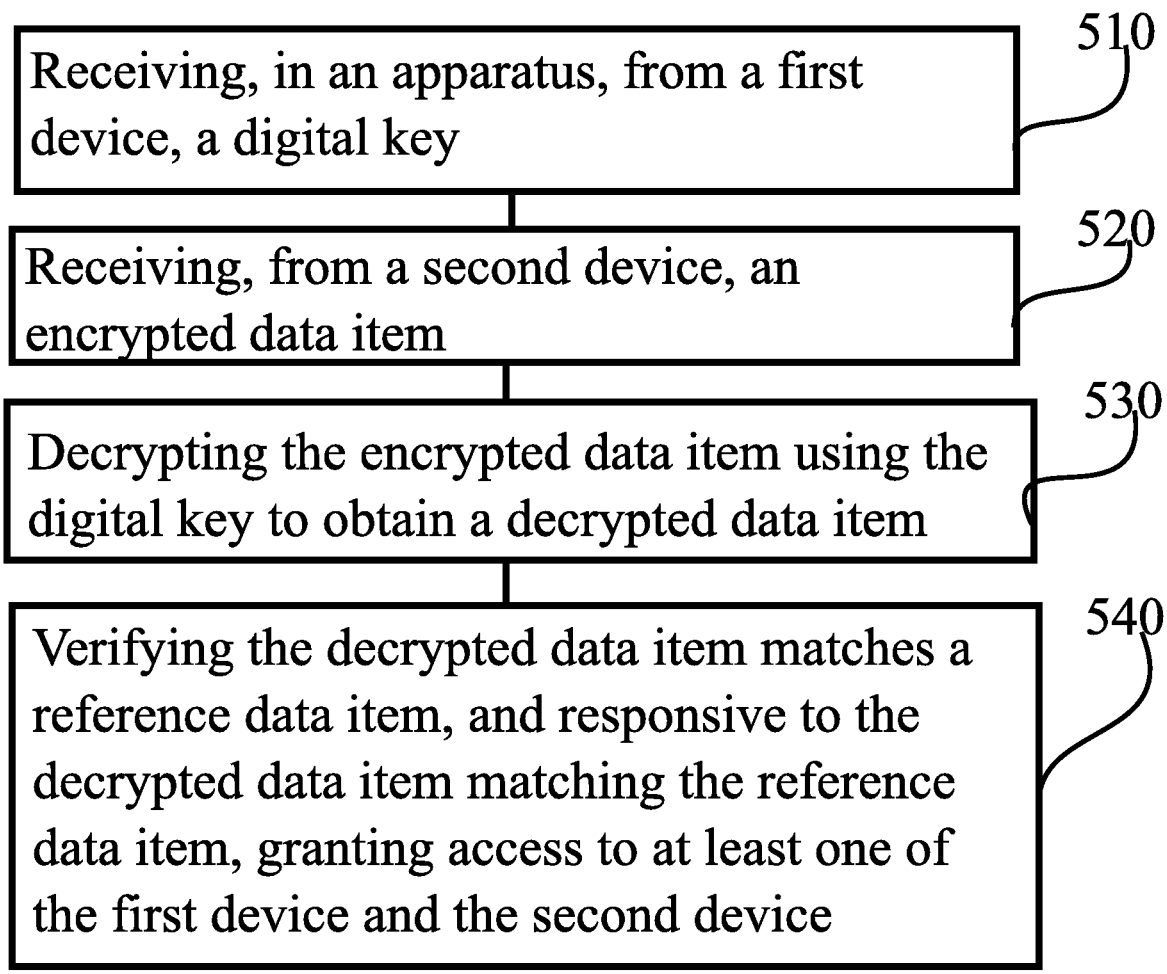
FIG. 5 is a flow graph of a first method in accordance with at least some embodiments of the present invention.

FIG. 5 is a flow graph of a first method in accordance with at least some embodiments of the present invention. The phases of the illustrated method may take place in apparatus 120, for example, or in a control device configured to control the functioning of apparatus 120, when implanted therein.

Phase 510 comprises receiving, in an apparatus, from a first device, a digital key. Phase 520 comprises receiving, from a second device, an encrypted data item. Phase 530 comprises decrypting the encrypted data item using the digital key to obtain a decrypted data item. Finally, phase 530 comprises verifying the decrypted data item matches a reference data item, and responsive to the decrypted data item matching the reference data item, granting access to at least one of the first device and the second device. As described above, in some embodiments the verifying includes two decrypting operations.

Figure 6:
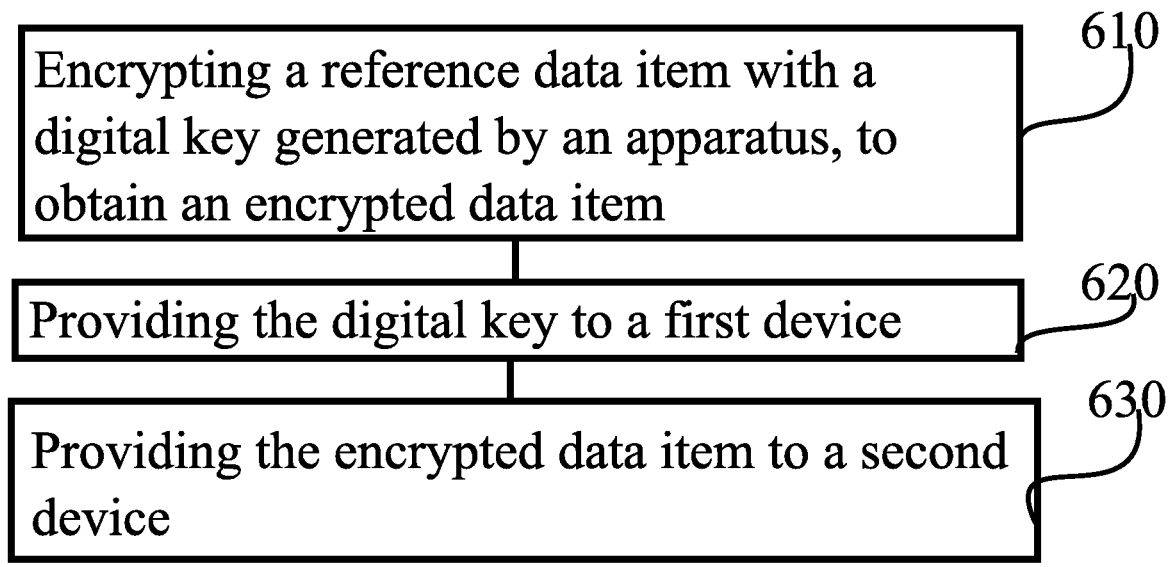
FIG. 6 is a flow graph of a second method in accordance with at least some embodiments of the present invention.

FIG. 6 is a flow graph of a second method in accordance with at least some embodiments of the present invention. The phases of the illustrated method may take place in apparatus 120, for example, or in a control device configured to control the functioning of apparatus 120, when implanted therein.

Phase 610 comprises encrypting a reference data item with a digital key generated by an apparatus, to obtain an encrypted data item. Phase 620 comprises providing the digital key to a first device. Finally, phase 630 comprises providing the encrypted data item to a second device It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in two-person authenticated systems.

ACRONYMS LIST

3DES Triple-data encryption standard
AES Advanced encryption standard
BT LE Bluetooth low-energy
GATT Generic attribute profile
https Hypertext transfer protocol secure, HTTP over TLS
LTE Long term evolution
NFC Near field communication
SIM Subscriber identity module
ssh Secure shell
WCDMA Wideband code division multiple access
WiMAX Worldwide interoperability for microwave access
WLAN Wireless local area network

REFERENCE SIGNS LIST

| | |
|---|---|
| 110 | Device 110 of FIG. 1 |
| 130 | Device 130 of FIG. 1 |
| 120 | Apparatus 120 of FIG. 1 |
| 140 | Access point of FIG. 1 |
| 150 | Network node of FIG. 1 |
| 160 | Server 160 of FIG. 1 |
| 210 | wire-line interface of FIG. 2 |
| 220 | wire-line interfaces of FIG. 2 |
| 230 | Inter-device interface of FIG. 2 |
| 310-370 | Structure of FIG. 3 |
| 410-4110 | Phases of the method of FIG. 4 |
| 510-540 | Phases of the method of FIG. 5 |
| 610-630 | Phases of the method of FIG. 6 |

The invention claimed is:

1. An apparatus comprising at least one processing core, at least one memory including computer program code, the at least one memory and the computer program code being configured to, with the at least one processing core, cause the apparatus comprising said at least one processing core and said at least one memory at least to:
receive from a first device a digital key;
receive from a second device an encrypted data item;

decrypt the encrypted data item using the digital key to obtain a first decrypted data item, decrypt the first decrypted data item to obtain a second decrypted data item and verify the second decrypted data item matches a reference data item, and responsive to the second decrypted data item matching the reference data item, grant access to at least one of the first device and the second device, wherein the at least one memory and the computer program code are configured to, with the at least one processing core, cause the apparatus to decrypt the encrypted data item using, at least in part, an exclusive-or, XOR, operation with the digital key and the encrypted data item.

2. The apparatus according to claim 1, wherein the at least one memory and the computer program code are configured to, with the at least one processing core, cause the apparatus to decrypt the encrypted data item using, at least in part, a symmetric decryption algorithm.

3. The apparatus according to claim 1, wherein the at least one memory and the computer program code are configured to, with the at least one processing core, cause the apparatus to decrypt the encrypted data item using, at least in part, a public key decryption algorithm.

4. The apparatus according to claim 1, wherein the at least one memory and the computer program code are configured to, with the at least one processing core, cause the apparatus to grant access to the first device.

5. The apparatus according to claim 4, wherein the at least one memory and the computer program code are configured to, with the at least one processing core, cause the apparatus to grant at least one of the first device and the second device access to a service provided by or controlled by the apparatus.

6. The apparatus according to claim 5, wherein the service comprises at least one of the following: a media playback service, a data storage service and a physical access control service.

7. The apparatus according to claim 1, wherein the at least one memory and the computer program code are configured to, with the at least one processing core, cause the apparatus to decrypt, using an encryption key stored in the apparatus, the decrypted data item prior to the verifying.

8. An apparatus comprising at least one processing core, at least one memory including computer program code, the at least one memory and the computer program code being configured to, with the at least one processing core, cause the apparatus comprising said at least one processing core and said at least one memory at least to:
encrypt a reference data item with a digital key generated by the apparatus, to obtain an encrypted data item and encrypt the encrypted data item to obtain a second encrypted data item, wherein the at least one processing core and said at least one memory are configured to encrypt the reference data item using, at least in part, an exclusive-or, XOR, operation with the digital key and the reference data item;
provide the digital key to a first device, and
provide the second encrypted data item to a second device, and perform verifying whether the first device and the second device can satisfy a two-man rule of a further apparatus.

9. The apparatus according to claim 8, wherein the at least one memory and the computer program code are configured to, with the at least one processing core, cause the apparatus to verify whether the first device is authorized to access a service providing apparatus, and to provide the digital key to the first device only responsive to the first device being verified as authorized to access the service providing apparatus.

10. The apparatus according to claim 9, wherein the at least one memory and the computer program code are configured to, with the at least one processing core, cause the apparatus to verify whether the apparatus has received requests from devices that can satisfy the two-man rule of a further apparatus.

11. The apparatus according to claim 9, wherein the at least one memory and the computer program code are configured to, with the at least one processing core, cause the apparatus to verify whether the first device is authorized to access a service providing apparatus by checking whether an identity of the first device is comprised in a list of identities of devices that are authorized to access the service providing apparatus.

12. A method comprising:
receiving, in an apparatus, from a first device, a digital key;
receiving, from a second device, an encrypted data item;
decrypting the encrypted data item using the digital key to obtain a first decrypted data item, decrypting the first decrypted data item to obtain a second decrypted data item and
verifying the second decrypted data item matches a reference data item, and responsive to the second decrypted data item matching the reference data item, granting access to at least one of the first device and the second device, wherein the encrypted data item is decrypted using, at least in part, an exclusive-or, XOR, operation with the digital key and the encrypted data item.

13. The method according to claim 12, further comprising granting access to the first device.

14. The method according to claim 13, wherein the at least one memory and the computer program code are configured to, with the at least one processing core, cause the apparatus to grant at least one of the first device and the second device access to a service provided by or controlled by the apparatus.

15. The method according to claim 14, wherein the service comprises at least one of the following: a media playback service, a data storage service and a physical access control service.

16. The method according to claim 12, further comprising cause the apparatus to decrypt, using an encryption key stored in the apparatus, the decrypted data item prior to the verifying.

17. A method comprising:
encrypting a reference data item with a digital key generated by an apparatus, to obtain an encrypted data item and encrypt the encrypted data item to obtain a second encrypted data item wherein the reference data item is encrypted using, at least in part, an exclusive-or, XOR, operation with the digital key and the reference data item;
providing the digital key to a first device, and
providing the second encrypted data item to a second device, and verifying whether the first device and the second device can satisfy a two-man rule of a further apparatus.

18. The method according to claim 17, further comprising verifying whether the first device is authorized to access a service providing apparatus, and wherein the digital key is provided to the first device only responsive to the first device being verified as authorized to access the service providing apparatus.

19. A non-transitory computer readable medium having stored thereon a set of computer readable instructions that, when executed by at least one processor, cause an apparatus to at least:

receive, in an apparatus, from a first device, a digital key;
receive, from a second device, an encrypted data item;
decrypt the encrypted data item using the digital key to obtain a first decrypted data item, decrypting the first decrypted data item to obtain a second decrypted data item and
verify the second decrypted data item matches a reference data item, and responsive to the second decrypted data item matching the reference data item, grant access to at least one of the first device and the second device, wherein the computer readable instructions are configured to cause the apparatus to decrypt the encrypted data item using, at least in part, an exclusive-or, XOR, operation with the digital key and the encrypted data item.

20. The apparatus according to claim 8, wherein a user of the second device may trigger or approve of the participation of the second device in a two-man authentication procedure.

* * * * *